United States Patent
Shibutani et al.

(10) Patent No.: US 8,026,302 B2
(45) Date of Patent: Sep. 27, 2011

(54) POLYVINYL ALCOHOL RESIN COMPOSITION AND FILMS

(75) Inventors: Mitsuo Shibutani, Osaka (JP); Norihito Sakai, Osaka (JP)

(73) Assignee: The Nippon Synthetic Chemical Industry Co., Ltd., Osaka-shi (JP)

( * ) Notice: Subject to any disclaimer, the term of this patent is extended or adjusted under 35 U.S.C. 154(b) by 88 days.

(21) Appl. No.: 12/509,634

(22) Filed: Jul. 27, 2009

(65) Prior Publication Data

US 2009/0286909 A1      Nov. 19, 2009

Related U.S. Application Data

(63) Continuation of application No. PCT/JP2008/051087, filed on Jan. 25, 2009.

(30) Foreign Application Priority Data

Jan. 31, 2007   (JP) .................................. 2007-021839
Jan. 29, 2008   (JP) .................................. 2008-017067

(51) Int. Cl.
  *C08K 5/15*           (2006.01)
(52) U.S. Cl. ........ 524/114; 428/500; 428/515; 428/516; 524/366; 524/378; 525/58
(58) Field of Classification Search .................. 428/500, 428/515, 516; 525/58; 524/114, 366, 378
See application file for complete search history.

(56) References Cited

U.S. PATENT DOCUMENTS

| 3,106,543 | A | * | 10/1963 | Milne ............................... 525/57 |
| 5,968,244 | A | * | 10/1999 | Ueda et al. .................. 106/31.86 |
| 6,033,806 | A | * | 3/2000 | Sugiura et al. ................. 429/229 |
| 6,121,400 | A | * | 9/2000 | Webster et al. ................ 526/333 |
| 6,451,099 | B1 | * | 9/2002 | Miyamoto et al. .......... 106/31.86 |

FOREIGN PATENT DOCUMENTS

| JP | 42-22290 | | 11/1967 |
| JP | 9-272719 | | 10/1997 |
| JP | 9-272773 | | 10/1997 |
| JP | 9-272775 | | 10/1997 |
| JP | 9-296088 | | 11/1997 |
| JP | 2001-302868 A1 | | 10/2001 |
| JP | 2003-335934 | | 11/2003 |
| JP | 2004-75866 A1 | | 3/2004 |
| JP | 2004075866 A | * | 3/2004 |
| JP | 2005-501763 | | 1/2005 |
| JP | 2005-306901 | | 11/2005 |
| JP | 2006-124682 A1 | | 5/2006 |
| JP | 2006-257225 A1 | | 9/2006 |
| JP | 2006-299238 A1 | | 11/2006 |
| JP | 2006-312313 A1 | | 11/2006 |
| JP | 2006299238 A | * | 11/2006 |
| JP | 2006312313 A | * | 11/2006 |
| WO | WO 03/020823 A1 | | 3/2003 |

OTHER PUBLICATIONS

International Search Report for International Application No. PCT/JP2008/051087 dated Apr. 14, 2008.

* cited by examiner

*Primary Examiner* — David W Wu
*Assistant Examiner* — Marie Reddick
(74) *Attorney, Agent, or Firm* — Kratz, Quintos & Hanson, LLP

(57) ABSTRACT

A PVA resin composition is provided which is excellent in melt-formability and free from emanation of odor in a melt-forming process, and is capable of providing a product free from residual odor, a highly transparent film and a laminate film having higher interlayer adhesive strength. The resin composition comprises: (A) a polyvinyl alcohol resin having a 1,2-diol structural unit represented by the following formula (1):

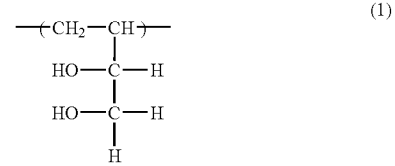

and having a saponification degree of 80 to 97.9 mol %; and (B) an alkylene oxide adduct of a polyvalent alcohol containing 5 to 9 moles of an alkylene oxide per 1 mole of the polyvalent alcohol.

12 Claims, No Drawings

POLYVINYL ALCOHOL RESIN COMPOSITION AND FILMS

RELATED APPLICATIONS

This application is a continuation of PCT application JP2008-051087 filed Jan. 25, 2009, which is hereby incorporated by reference.

BACKGROUND OF THE INVENTION

1. Field of the Invention

The present invention relates to a polyvinyl alcohol resin composition and films. More specifically, the present invention relates to a polyvinyl alcohol (hereinafter abbreviated as "PVA") resin composition which is free from emanation of odor in a melt-forming process and excellent in transparency, and is capable of providing a product free from residual odor and a laminate film having higher interlayer adhesive strength. The present invention further relates to films produced by using such a PVA resin composition.

2. Description of the Related Art

A PVA resin generally has a fusion starting temperature that is very close to its thermal decomposition temperature. This makes it difficult to produce a product directly from the PVA resin by a melt-forming method. A conceivable approach to improvement of thermal stability in the melt forming process is to reduce the fusion starting temperature of the PVA resin by addition of a plasticizer such as glycerol or polyethylene glycol.

For example, JP-A-HEI9 (1997)-272719 proposes a resin composition prepared by blending a compound containing 2 to 4 moles of an alkylene oxide per 1 mole of a polyvalent (tri- or more valent) alcohol as a plasticizer with a PVA resin having a polymerization degree greater than 500 and not greater than 5000, and discloses that the resin composition is excellent in thermal stability in the melt-forming process and a product melt-formed from the resin composition is excellent in toughness and water solubility and substantially free from migration of the plasticizer.

The resin composition is effective to some extent for solving the aforementioned problem, but the product melt-formed from the resin composition suffers from fish eyes and gelation, requiring improvement.

On the other hand, JP-A-2001-302868 proposes a resin composition prepared by blending a compound containing 1 to 4 moles of an alkylene oxide in average per 1 mole of a polyvalent (tri- or more valent) alcohol as a plasticizer with a PVA resin having a viscosity average polymerization degree of 200 to 500, and discloses that the resin composition is excellent in melt spinnability and melt formability and is capable of providing various types of melt-formed products which are excellent in mechanical properties such as shock resistance and strength and substantially free from fish eyes, gelation and surface migration of the plasticizer and have a smooth appearance.

In examples of the invention disclosed in JP-A-2001-302868, a non-modified and partially saponified PVA resin having a saponification degree of 80 mol %, and PVA resins modified with an α-olefin such as ethylene, octyl vinyl ether or 7-hydroxy-1-octene are used. These PVA resins each have a lower crystallinity, and the use of any of these PVA resins reduces the melt viscosity of the resin composition, thereby improving the formability of the resin composition.

Even with the use of the plasticizer and any of the lower crystallinity PVA resins, a temperature not lower than 200° C. is required for the melt-forming of the resulting resin composition. This leads to thermal decomposition and/or evaporation of the plasticizer and other additives, detachment of an acetyl group from the partially saponified PVA resin, and detachment, thermal decomposition and/or evaporation of a modification group from the modified PVA resin, thereby causing problems associated with odor and environmental pollution. Where the plasticizer is less compatible with the PVA resin, phase separation is liable to occur in the melt-forming process, thereby reducing the transparency. Further, where the PVA resin composition is used for production of a laminate film, the surface migration of the plasticizer impairs the interlayer adhesive strength.

In general, the major main-chain bonds of the PVA resin are 1,3-glycol bonds. It is known that a PVA resin including a greater proportion of main-chain 1,2-glycol bonds than an ordinary level (about 1.8 mol %) can be prepared for melt-forming thereof by increasing the proportion of head-to-head bonds or tail-to-tail bonds through polymerization of vinyl acetate at a higher polymerization temperature (JP-A-2001-181405).

However, the main-chain 1,2-glycol bonds are less effective for the reduction of the crystallinity of the PVA resin than side-chain 1,2-diol structural unit. Further, hydroxyl groups of the PVA resin are all secondary hydroxyl groups as in ordinary PVA resins. Therefore, strong hydrogen bonds and intermolecular cohesive force attributable to primary hydroxyl groups cannot be expected from this PVA resin.

It is also known that a PVA resin having a hydroxyalkyl group at its side chain is prepared through copolymerization with an α-olefin having a hydroxyl group and used for the melt-forming (see, for example, JP-A-2001-302868). However, the PVA resin suffers from abnormal fluidization in the melt-forming process, thereby requiring further improvement in formability.

It is therefore an object of the present invention to provide a PVA resin composition which is excellent in melt-formability and free from emanation of odor in the melt-forming process, and is capable of providing a product free from residual odor, a highly transparent film and a laminate film having higher interlayer adhesive strength.

SUMMARY OF THE INVENTION

In view of the foregoing, the inventors of the present invention conducted intensive studies and, as a result, attained the present invention.

According to a first aspect of the present invention, there is provided a resin composition, which comprises: (A) a PVA resin having a 1,2-diol structural unit represented by the following general formula (1):

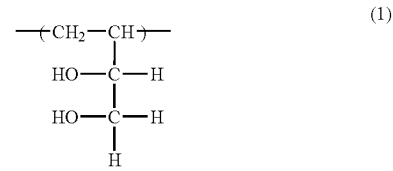

and having a saponification degree of 80 to 97.9 mol %; and (B) an alkylene oxide adduct of a polyvalent alcohol containing 5 to 9 moles of an alkylene oxide per 1 mole of the polyvalent alcohol.

With this arrangement, the compatibility between the PVA resin (A) and the adduct (B) is significantly improved.

According to a second aspect of the present invention, there is provided a film composed of the resin composition described above.

According to a third aspect of the present invention, there is provided a laminate film comprising a plurality of layers, at least one of which is composed of the resin composition described above.

The resin composition according to the present invention is excellent in melt-formability and free from emanation of odor in the melt-forming process, and is capable of providing a product free from residual odor, a highly transparent film and a laminate film having higher interlayer adhesive strength.

These advantages are provided because the PVA resin (A) having the 1,2-diol structural unit represented by the above general formula (1) and having the specific saponification degree and the alkylene oxide adduct (B) of the polyvalent alcohol having a greater amount of the alkylene oxide are employed to significantly improve the compatibility between the PVA resin (A) and the adduct (B). The compatibility is supposedly improved by the strong hydrogen bonds and the intermolecular cohesive force attributable to the primary hydroxyl groups in the PVA resin.

The film composed of the inventive PVA resin composition is useful, for example, as a temporary base material such as a hydraulic transfer film, a seeding sheet, a seeding tape or an embroidery base in applications which require water solubility. The laminate film is useful, for example, for a moisture conditioning container, a gas barrier packaging material, or a recyclable film or container. Exemplary applications of the laminate film include packages (unit packages) of chemical agents such as agricultural chemicals and detergents, sanitary products such as sanitary napkins, diapers and ostomy bags, and medical products such as blood absorption sheets.

DETAILED DESCRIPTION OF PREFERRED EMBODIMENTS

The present invention will hereinafter be described in detail.

The present invention will be described by way of typical example, but not by way of limitation.

A PVA resin (A) to be used in the present invention has a 1,2-diol structural unit represented by the following general formula (1):

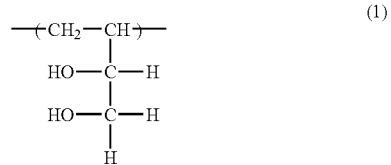

(1)

and has a saponification degree of 80 to 97.9 mol %. The PVA resin (A) is prepared by copolymerizing a vinyl ester monomer, and a monomer to be converted into the 1,2-diol structural unit represented by the general formula (1) through polymerization and saponification, and then hydrolyzing (saponifying) the resulting copolymer.

It is important that the 1,2-diol structural unit is present in the PVA resin (A) typically in a proportion of 2 to 15 mol %, preferably 4 to 12 mol %, particularly preferably 5 to 10 mol %. If the proportion of the 1,2-diol structural unit is too small, the resulting PVA resin is liable to have a higher melting point and, hence, a narrower melt-forming temperature range because of a smaller difference between the melting point and the thermal decomposition temperature. This deteriorates the melt-formability, and drastically deteriorates the long-run formability. If the proportion of the 1,2-diol structural unit is too great, the resulting PVA resin tends to be highly adhesive to metal. Therefore, the PVA resin is liable to remain in a melt-forming machine, thereby suffering from gelation, thermal crosslinking and thermal deterioration due to thermal history. This makes it impossible to stably perform the melt-forming process.

The proportion of the 1,2-diol structural unit (1) may be controlled by blending at least two PVA resins (A) having different amounts of the 1,2-diol structural unit (1). In this case, at least one of the PVA resins may be a PVA resin not having the structural unit (1).

Where the PVA resin having the structural unit (1) and the PVA resin not having the structural unit (1) are blended for use, the former should be a main component. The PVA resin having the structural unit (1) is preferably present in a proportion of 60 to 99 wt %, particularly preferably 70 to 99 wt %.

The total amount of the side chain 1,2-diol structural unit of the PVA resins thus controlled may be calculated as a weight average, and may be more accurately determined based on $^1$H-NMR measurement results.

The PVA resin (A) preferably has a saponification degree of 88 to 96 mol % as measured by a titration method (JIS K6726).

By reducing the saponification degree of the PVA resin, the melting point of the PVA resin is reduced, making the melt-forming easier. However, an excessively low saponification degree tends to result in emanation of acetic acid odor, and reduction in heat stability and long-run formability. On the other hand, if the saponification degree is higher, the compatibility between the PVA resin and an alkylene oxide adduct of a polyvalent alcohol tends to be slightly reduced. Particularly, a product formed from the resulting resin composition tends to suffer from bleeding of the adduct over time depending on storage conditions of the product.

The saponification degree as defined in the present invention is the percentage (mol %) of the total amount of an ester portion of a vinyl ester monomer, and an acyloxy portion, a carbonate portion and an acetal portion of the comonomer (which provides the 1,2-diol structural unit) converted into hydroxyl groups.

The polymerization degree of the PVA resin (A) is typically 200 to 1200, preferably 250 to 750, particularly preferably 300 to 500, as measured by an aqueous solution viscosity measurement method (JIS K6726). If the polymerization degree is too low, a product formed from the resulting resin composition is liable to have lower strength and therefore suffer from cutting, cracking and tearing. If the polymerization degree is too high, the resin is liable to be thermally decomposed due to generation of shearing heat in an extruder.

The PVA resin (A) typically has a melting point of 90° C. to 220° C., preferably 140° C. to 200° C., particularly preferably 155° C. to 195° C.

A preparation method for the PVA resin (A) to be used in the present invention is not particularly limited, but exemplary preparation methods are as follows: (1) a vinyl ester monomer is copolymerized with a comonomer selected from 3,4-diol-1-butene, 3,4-diacyloxy-1-butenes, 3-acyloxy-4-ol-1-butenes and 4-acyloxy-3-ol-1-butenes, and the resulting copolymer is saponified; (2) a vinyl ester monomer is copolymerized with vinyl ethylene carbonate or a like comonomer, and the resulting copolymer is saponified and decarbonated; and (3) a vinyl ester monomer is copolymerized with a comonomer selected from 2,2-dialkyl-4-vinyl-1,3-dioxoranes and the like, and the resulting copolymer is saponified and deacetalized.

Among the aforementioned preparation methods, the preparation method (1) is preferably employed, because the method (1) ensures proper polymerization, and easy and homogeneous distribution of the 1,2-diol structural unit in the PVA resin in the preparation of the PVA resin. Further, the resulting PVA resin is substantially free from problems in the melt-forming process, and a film produced as a final product has excellent properties. It is particularly preferred that the vinyl ester monomer is copolymerized with any of the 3,4-diacyloxy-1-butenes which are excellent in copolymerization reactivity, and the resulting copolymer is saponified. Particularly, 3,4-diacetoxy-1-butene is preferably used as the 3,4-diacyloxy-1-butene. Further, a mixture of these 3,4-diacyloxy-1-butenes may be used as the comonomer.

Where vinyl acetate is used as the vinyl ester monomer and copolymerized with 3,4-diacetoxy-1-butene, the monomer reactivity ratios are r(vinyl acetate)=0.710 and r(3,4-diacetoxy-1-butene)=0.701. For comparison, the monomer reactivity ratios for copolymerization with vinyl ethylene carbonate to be described later are r (vinyl acetate)=0.85 and r(vinyl ethylene carbonate)=5.4. Therefore, 3,4-diacetoxy-1-butene is more excellent in copolymerization reactivity with vinyl acetate.

The chain transfer constant of 3,4-diacetoxy-1-butene is Cx(3,4-diacetoxy-1-butene)=0.003 (65° C.). For comparison, the chain transfer constant of vinyl ethylene carbonate is Cx(vinyl ethylene carbonate)=0.005 (65° C.), and the chain transfer constant of 2,2-dimethyl-4-vinyl-1,3-dioxolane is Cx(2,2-dimethyl-4-vinyl-1,3-dioxolane)=0.023 (65° C.). Without any polymerization inhibiting factor, the polymerization degree is more easily increased, and the polymerization rate is unlikely to be reduced.

Further, a secondary product resulting from the saponification of the copolymer of 3,4-diacetoxy-1-butene is the same as a product derived from the vinyl acetate structural unit as a major structural unit. This provides a great industrial advantage without the need for provision of a special device or step for a post treatment. Further, very small amounts of 3,4-diacetoxy-1-butane, 1,4-diacetoxy-1-butene and 1,4-diacetoxy-1-butane may be contained as impurities.

It is noted that 3,4-diol-1-butene is commercially available from Eastman Chemical Product Inc. An industrial grade 3,4-diacetoxy-1-butene is commercially available from Eastman Chemical Product Inc., and a reagent grade 3,4-diacetoxy-1-butene is commercially available from Across Co., Ltd. Further, 3,4-diacetoxy-1-butene produced as a secondary product in the production of 1,4-butandiol may be used.

Where the PVA resin prepared by the preparation method (2) as having the 1,2-diol structural unit has a lower saponification degree or is insufficient in decarboxylation, the PVA resin is liable to have residual carbonate rings at its side chains. In this case, the PVA resin is decarboxylated during the melt-forming process, so that air bubbles occur in a formed product to cause fish eyes. Further, the PVA resin becomes less compatible with the adduct (B). Therefore, consideration should be given to these drawbacks when the PVA resin prepared by the preparation method (2) is used. Like the PVA resin prepared by the method (2), the PVA resin prepared by the method (3) as having the 1,2-diol structural unit is liable to suffer from detachment of monomer-originated functional groups (acetal rings) from side chains during the melt-forming process to cause fish eyes in a formed product, or suffer from reduction in compatibility, resulting in poorer transparency and deteriorated physical properties. Therefore, consideration should be given to these drawbacks when the PVA resin prepared by the preparation method (3) is used.

Examples of the vinyl ester monomer include vinyl formate, vinyl acetate, vinyl propionate, vinyl valerate, vinyl butyrate, vinyl isobutyrate, vinyl pivalate, vinyl caprate, vinyl laurate, vinyl stearate, vinyl benzoate and vinyl versatate, among which vinyl acetate is preferably used from an economic viewpoint.

The weight-based proportion of the PVA resin (A) having the 1,2-diol structural unit represented by the above general formula (1) for the copolymerization is not particularly limited, but may be determined according to the amount of the 1,2-diol structural unit intended to be introduced into the copolymer.

An additional comonomer may be employed for the copolymerization, as long as the physical properties of the resin are not significantly influenced. Examples of the additional comonomer include: α-olefins such as ethylene and propylene; hydroxyl-containing α-olefins such as 3-buten-1-ol, 4-penten-1-ol, 5-hexene-1,2-diol; unsaturated acids such as itaconic acid, maleic acid and acrylic acid, and salts, monoalkyl esters or dialkyl esters of these unsaturated acids; nitriles such as acrylonitrile; amides such as methacrylamide and diacetone acrylamide; and olefin sulfonic acids such as ethylene sulfonic acid, allyl sulfonic acid, methallyl sulfonic acid and AMPS, and salts of these olefin sulfonic acids.

At the end of the polymerization, a known polymerization inhibitor for use in radical polymerization is preferably added to the reaction system. Examples of the polymerization inhibitor include m-dinitrobenzene, ascorbic acid, benzoquinone, a dimer of α-methylstyrene, and p-methoxyphenol.

Then, the resulting copolymer is saponified, and the resulting resin is separated and dried. Thus, the PVA resin (A) having the 1,2-diol structural unit represented by the above general formula (1) is provided.

The PVA resin (A) to be used in the present invention may be a blend of a PVA resin having the structural unit (1) and an additional PVA resin. The additional PVA resin may have a different structural unit, a different saponification degree or a different molecular weight.

The PVA resin (A) serves as a base resin in the inventive PVA resin composition. The PVA resin (A) is typically present in a proportion of not less than 50 wt %, preferably 80 to 97 wt %, particularly preferably 90 to 97 wt %, based on the overall weight of the resin composition.

In the present invention, an alkylene oxide adduct (B) of a polyvalent alcohol containing 5 to 9 moles of an alkylene oxide per 1 mole of the polyvalent alcohol is used in combination with the above PVA resin (A).

The adduct (B) is provided by addition of the alkylene oxide to the hydroxyl groups of the polyvalent alcohol and, therefore, has ether bonds and hydroxyl groups.

Such a reaction is schematically shown by the following chemical expression (I):

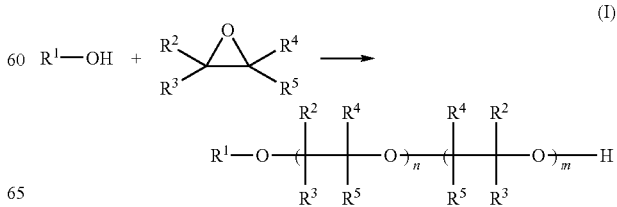

wherein $R^1$ is an organic group having one or more hydroxyl groups, $R^2$ to $R^5$ are each a hydrogen atom or an organic group, n and m are integers not less than zero, the recurring units may be bonded in a random form or in a block form, and n+m>0. In this chemical expression, $R^1$ has one or more hydroxyl groups. Though not shown for convenience, such hydroxyl groups also react in the same manner as the illustrated hydroxyl group.

Further, the alkylene oxide may crosslink intramolecular or intermolecular hydroxyl groups of the polyvalent alcohol. The adduct (B) to be used in the present invention is a mixture of reaction products obtained through a reaction between the polyvalent alcohol and the alkylene oxide.

In the present invention, the hydroxyl value of the alkylene oxide adduct (B) of the polyvalent alcohol may be important. Where the polarity of the adduct (B) is compatible with the polarity of the resin (A), the compatibility between the resin (A) and the adduct (B) is supposedly further improved. The hydroxyl value (mg KOH/g) of the adduct (B) is typically 200 to 1500 mg KOH/g, preferably 300 to 1200 mg KOH/g, particularly preferably 400 to 1000 mg KOH/g.

The polyvalent alcohol for the alkylene oxide adduct (B) is a compound having a plurality of hydroxyl groups, typically a divalent to 15-valent alcohol, preferably a divalent to decavalent alcohol, more preferably a trivalent to hexavalent alcohol, particularly preferably a trivalent alcohol. The polyvalent alcohol typically has a carbon number of 2 to 20, preferably 3 to 10, particularly preferably 3 to 6.

The polyvalent alcohol may be aliphatic or aromatic, but is preferably an aliphatic alcohol. Specific examples of the polyvalent alcohol include: glycerol and glycerol derivatives such as diglycerol; polymethylene glycols such as trimethylene glycol, tetramethylene glycol, pentamethylene glycol and hexamethylene glycol; ethylene glycol and ethylene glycol derivatives such as diethylene glycol and triethylene glycol; propylene glycol and propylene glycol derivatives such as dipropylene glycol; and other alkylene glycol derivatives defined as a generic term. Other examples of the polyvalent alcohol include: divalent alcohols such as 1,2-propanediol, 1,3-propanediol, 1,2-butanediol, 1,3-butanediol, 2,3-butanediol, 1,4-butanediol, 1,5-pentanediol and 2,5-hexanediol; amines such as diethanolamine, triethanolamine, di-2-amino-2-hydroxymethyl-1,3-propanediol, tri-2-amino-2-hydroxymethyl-1,3-propanediol and poly-2-amino-2-hydroxymethyl-1,3-propanediol each having hydroxyl groups, and derivatives such as dimers and trimers of any of these amines; trivalent alcohols such as 3-methylpentane-1,3,5-triol, 1,2,6-hexanetriol, 2-(2-hydroxypropyl)propane-1,3-diol and 2-ethyl-2-hydroxymethyl-1,3-propanediol; tetravalent alcohols including pentaerythritol and pentaerythritol derivatives such as di-pentaerythritol, tri-pentaerythritol and poly-pentaerythritol (a dimer, a trimer and a polymer of pentaerythritol); trimethylol methane and trimethylol methane derivatives such as di-trimethylol methane, tri-trimethylol methane and poly-trimethylol methane (a dimer, a trimer and a polymer of trimethylol methane); trimethylol ethane and trimethylol ethane derivatives such as di-trimethylol ethane and tri-trimethylol ethane (a dimer and a trimer of trimethylol ethane); trimethylol propane and trimethylol propane derivatives such as di-trimethylol propane and tri-trimethylol propane (a dimer and a trimer of trimethylol propane); other trimethylol alkane derivatives such as dimers and trimers of trimethylol alkanes; saccharides such as mannitol, sorbitol, fructose, glucose and arabinitol; pentavalent and hexavalent alcohols and their esters with carboxylic acids such as monocarboxylic acids, dicarboxylic acids, tricarboxylic acids.

These polyvalent alcohols may be used in a powdery form, in a granular form, in a liquid form, in a paste form, or in an emulsion form.

Among these polyvalent alcohols, glycerol and glycerol derivatives such as diglycerol are preferred because they are highly compatible with the PVA resin (A), and glycerol is particularly preferred because of its compatibility and non-bleeding property.

The alkylene oxide to be used for the preparation of the alkylene oxide adduct (B) of the polyvalent alcohol is a compound having at least one epoxy ring in its molecule. Where an alkylene oxide having one epoxy ring is defined as a monovalent alkylene oxide, a monovalent to trivalent alkylene oxide is typically used, and a monovalent alkylene oxide is preferably used. Further, the alkylene oxide typically has a carbon number of 2 to 20, preferably 2 to 10, particularly preferably 2 to 6.

More specifically, the monovalent alkylene oxide is represented by the following general formula (2):

wherein $R^2$ to $R^5$ are each a hydrogen atom or an organic group.

In the above general formula (2), $R^2$ to $R^5$ are each typically a hydrogen atom.

The organic group in the above general formula (2) is not particularly limited, but examples thereof include: aliphatic hydrocarbon groups including alkyl groups such as a methyl group, an ethyl group, a n-propyl group, an isopropyl group, a n-butyl group, an isobutyl group and a tert-butyl group, and alkenyl groups; alicyclic hydrocarbon groups including cycloalkyl groups such as cyclobutyl, cyclopentyl and cyclohexyl, and cycloalkenyl groups; and halogen atoms, a hydroxyl group, acyloxy groups, alkoxycarbonyl groups, carboxyl groups and sulfonic groups.

Typical examples of the organic group include $C_1$ to $C_{10}$ aliphatic hydrocarbon groups, $C_3$ to $C_{10}$ alicyclic hydrocarbon groups and $C_6$ to $C_{10}$ aromatic hydrocarbon groups, among which $C_1$ to $C_5$ aliphatic hydrocarbon groups and $C_3$ to $C_6$ alicyclic hydrocarbon groups are preferred, and $C_1$ to $C_5$ aliphatic hydrocarbon groups are particularly preferred. These hydrocarbon groups may each have a substituent such as a halogen group, a hydroxyl group, an ester group, a carboxylic group or a sulfonic group.

Specific examples of the epoxy compound represented by the general formula (2) include: ethylene oxide and propylene oxide; epoxybutanes such as 1,2-epoxybutane, 2,3-epoxybutane and 3-methyl-1,2-epoxybutane; epoxypentanes such as 1,2-epoxypentane, 2,3-epoxypentane, 3-methyl-1,2-epoxypentane, 4-methyl-1,2-epoxypentane, 4-methyl-2,3-epoxypentane and 3-ethyl-1,2-epoxypentane; epoxyhexanes such as 1,2-epoxyhexane, 2,3-epoxyhexane, 3,4-epoxyhexane, 3-methyl-1,2-epoxyhexane, 4-methyl-1,2-epoxyhexane, 5-methyl-1,2-epoxyhexane, 3-ethyl-1,2-epoxyhexane, 3-propyl-1,2-epoxyhexane, 4-ethyl-1,2-epoxyhexane, 5-methyl-1,2-epoxyhexane, 4-methyl-2,3-epoxyhexane, 4-ethyl-2,3-epoxyhexane, 2-methyl-3,4-epoxyhexane and 2,5-dimethyl-3,4-epoxyhexane; epoxyheptanes such as 3-methyl-1,2-epoxyheptane, 4-methyl-1,2-epoxyheptane, 5-methyl-1,2-epoxyheptane, 6-methyl-1,2-epoxyheptane, 3-ethyl-1,2-epoxyheptane, 3-propyl-1,2-epoxyheptane, 3-butyl-1,2- epoxyheptane, 4-ethyl-1,2-epoxyheptane, 4-propyl-1,2-epoxyheptane, 5-ethyl-1,2-epoxyheptane, 4-methyl-2,3-epoxyheptane, 4-ethyl-2,3-epoxyheptane, 4-propyl-2,3-epoxyheptane, 2-methyl-3,4-epoxyheptane, 5-methyl-3,4-epoxyheptane, 5-ethyl-3,4-epoxyheptane, 2,5-dimethyl-3,4-epoxyheptane, 2-methyl-5-ethyl-3,4-epoxyheptane, 1,2-epoxyheptane, 2,3-epoxyheptane and 3,4-epoxyheptane; epoxyoctanes such as 1,2-epoxyoctane, 2,3-epoxyoctane, 3,4-epoxyoctane and 4,5-epoxyoctane; epoxynonanes such as 1,2-epoxynonane, 2,3-epoxynonane, 3,4-epoxynonane and 4,5-epoxynonane; epoxydecanes such as 1,2-epoxydecane, 2,3-epoxydecane, 3,4-epoxydecane, 4,5-epoxydecane and 5,6-epoxydecane; epoxyundecanes such as 1,2-epoxyundecane, 2,3-epoxyundecane, 3,4-epoxyundecane, 4,5-epoxyundecane and 5,6-epoxyundecane; epoxydodecanes such as 1,2-epoxydodecane, 2,3-epoxydodecane, 3,4-epoxydodecane, 4,5-epoxydodecane, 5,6-epoxydodecane and 6,7-epoxydodecane; and other aliphatic epoxy compounds.

In the above general formula (2), $R^2$ to $R^5$ may be combined together to provide a ring. Examples of the ring include alicyclic epoxy compounds such as 1,2-epoxycyclopentane, 1,2-epoxycyclohexane, 1,2-epoxycycloheptane, 1,2-epoxycyclooctane, 1,2-epoxycyclononane, 1,2-epoxycyclodecane, 1,2-epoxycycloundecane and 1,2-epoxycyclododecane.

Among these compounds, ethylene oxide and propylene oxide are preferred, and ethylene oxide is most preferred.

In the alkylene oxide adduct (B) of the polyvalent alcohol, the alkylene oxide is present in an amount of to 9 moles, preferably 5 to 7 moles, per 1 mole of the polyvalent alcohol. If the amount of the alkylene oxide is too small, the resulting resin composition is liable to have poorer formability. If the amount of the alkylene oxide is too great, the adduct is less compatible with the PVA resin.

The most preferred example of the alkylene oxide adduct (B) of the polyvalent alcohol is a compound prepared by adding ethylene oxide to glycerol, which is represented by the following formula (3):

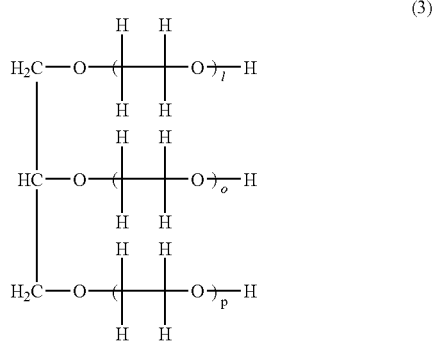

(3)

wherein l, o and p are each an integer not less than zero.

A method of the reaction between the polyvalent alcohol and the alkylene oxide described above is not particularly limited. An exemplary method is that a catalyst of an alkali metal hydroxide such as potassium hydroxide or sodium hydroxide or a strong base alkoxide such as potassium methoxide or sodium methoxide is heated together with the polyvalent alcohol to be melted, and the alkylene oxide is added to the resulting melt dropwise or by blowing. Examples of a commercially available product containing the adduct (B) include GLPM-60 produced by Nippon Nyukazai Co., Ltd., and UNIOX G series produced by NOF Corporation.

In the inventive resin composition, the alkylene oxide adduct (B) of the polyvalent alcohol is typically present in a proportion of 3 to 20 wt %, preferably 3 to 10 wt %, particularly preferably 3 to 5 wt %, based on the overall weight of the resin composition. If the proportion of the adduct (B) is too small, the resulting resin composition is liable to suffer from emanation of odor in the melt-forming process and have poorer transparency. If the proportion of the adduct (B) is too great, a product formed from the resulting resin composition tends to have lower strength and suffer from bleeding.

The weight ratio between the PVA resin (A) and the adduct (B) in the inventive resin composition is typically 80/20 to 97/3, preferably 85/15 to 97/3, particularly preferably 90/10 to 97/3. If the proportion of the adduct (B) is too small, the resulting resin composition is liable to suffer from emanation of odor in the melt-forming process and have poorer transparency. If the proportion of the adduct (B) is too great, a product formed from the resulting resin composition tends to have lower strength. When the PVA resin (A) and the adduct (B) are mixed together, the saponification degree of the PVA resin (A) is properly adjusted according to the modification degree of the adduct (B) as required.

Known additives may be blended in a proportion not greater than 5 wt % in the inventive resin composition. Examples of the additives include: plasticizers including aliphatic polyvalent alcohols such as glycerol, ethylene glycol and hexanediol, and sugar alcohols such as sorbitol, mannitol and pentaerythritol; lubricants including saturated aliphatic amide compounds such as stearamide and ethylene bissteara-mide, unsaturated aliphatic amide compounds such as olea-mide, aliphatic metal salts such as calcium stearate, magnesium stearate and zinc stearate, and lower molecular weight polyolefins such as lower molecular weight polyethylenes and lower molecular weight polypropylenes each having a molecular weight of about 500 to about 10000; inorganic acids such as boric acid and phosphoric acid; and antioxidants, heat stabilizers, light stabilizers, UV absorbents, colorants, antistatic agents, surfactants, antiseptic agents, antibiotic agents, antiblocking agents, slip agents and fillers, which may be blended in the inventive resin composition as required.

The preparation of the inventive resin composition may be achieved by dry-blending the PVA resin (A) and the alkylene oxide adduct (B) of the polyvalent alcohol, and then melt-kneading and pelletizing the resulting mixture, or by separately feeding the PVA resin (A) and the alkylene oxide adduct (B) of the polyvalent alcohol at predetermined rates into a melt-kneading machine and pelletizing the resulting melt.

The inventive resin composition typically has a melting point of 70° C. to 220° C., preferably not lower than 130° C. and lower than 200° C., particularly preferably 140° C. to 190° C. In the present invention, the PVA resin (A) typically has a thermal decomposition starting temperature of 240° C. to 250° C. as measured by means of a thermal gravity analyzer (TGA). Since the melting point of the resin is significantly lower than the thermal decomposition starting temperature, the resin composition can be melt-formed into a product at a higher temperature without deterioration.

The inventive resin composition typically has a melt flow rate (MFR at 190° C. with a load of 2160 g) of 10 to 100 g/10 min, preferably 10 to 80 g/min, particularly preferably 10 to 50 g/10 min. If the MFR is too high, the strength tends to be reduced. If the MFR is too low, it is difficult to increase the drawability. In the present invention, the MFR is determined in conformity with JIS K7210.

The inventive resin composition may be formed or molded by a known method, and a product thus formed or molded is used in a variety of application fields. Particularly, the inventive resin composition is suitable for the melt-forming method. The melt-forming method is not particularly limited, but examples thereof include extrusion methods such as a T-die extrusion method, an inflation method, a direct blow molding method and a blow molding method, an injection molding method, and a pressure forming method. Exemplary products to be formed or molded from the inventive resin composition include films, sheets, bottles and cups. The inventive resin composition may be formed into a single layer film. Further, the inventive resin composition may be coextruded with another resin into a laminate film, or may be melted and extruded over a paper sheet or a film to provide a laminate.

A lamination resin to be used together with the inventive resin composition for the formation of the laminate film is not particularly limited. Examples of the lamination resin include: olefin resins such as low-, medium- and high-density polyethylenes, linear low-density polyethylenes and ethylene-propylene copolymers; polyester resins including homopolymers and copolymers of alkylene arylates such as polyethylene terephthalates, polybutylene terephthalates, polyethylene naphthalates, and liquid crystal polyesters; polyamide resins such as nylon 6, nylon 66 and nylon 12; styrene resins such as polystyrenes and acrylonitrile-styrene copolymers; polycarbonate resins; polysulfone resins; polyphenylene ether resins; polyphenylene sulfide resins; and biodegradable resins including ethylene vinyl alcohol resins, polyvinyl alcohol resins, cellulose ester resins, aliphatic polyester resins such as polylactic resins, and aliphatic polyamide resins. Among these resins, the olefin resins are preferred, and the polyethylenes are particularly preferred.

The number of layers of the laminate or the laminate film is not particularly limited. Assuming that a multilayer film includes layers (a) (a1, a2, ...) formed of the inventive resin composition and layers (b) (b1, b2, ...) formed of other resin compositions, these layers may be arranged in any combination. For example, the laminate film or sheet may have an a/b double layer structure, a b/a/b structure, an a/b/a structure, an a1/a2/b structure, an a/b1/b2 structure, a b2/b1/a/b1/b2 structure or a b2/b1/a/b1/a/b1/b2 structure. The layer (a) typically has a thickness of 1 to 500 μm, and the layer (b) typically has a thickness of 1 to 500 μm. The laminate typically has a thickness of 1 to 1000 μm.

The single layer film or the multilayer film produced by using the inventive resin composition is preferably subjected to a stretching process such as a uniaxial stretching process or a biaxial stretching process (a simultaneous biaxial stretching process or a sequential biaxial stretching process) and a heat treatment process by known methods as required for improvement of physical properties thereof.

The inventive resin composition may be melt-spun into a filament by a known melt-spinning method. The inventive resin composition is preferably melt-spun together with another thermoplastic resin to provide a multi-component filament, which is woven into a fabric having higher strength, higher flexibility and a surface hydrophilic property or contains a water-soluble portion to be later removed. The inventive resin composition and the thermoplastic resin in the multi-component filament will hereinafter be referred to simply as a component ($\alpha$) and a component ($\beta$), respectively. In the present invention, the multi-component filament is defined as a monofilament or a multifilament including two or more types of resins present in two or more phases.

The spinning method is not particularly limited, but an exemplary method is to melt-spin the resins from a compound nozzle with the use of a known melt-spinning machine. The spinning temperature is such that the resin composition is meltable and free from degradation. The spinning temperature is typically 120° C. to 230° C., preferably not lower than 150° C. and lower than 200° C., particularly preferably 160° C. to 190° C. If the spinning temperature is too high, the resins are decomposed. If the spinning temperature is too low, the melt-forming is impossible because an excessively high torque is applied to an extruder.

The thermoplastic resin to be used in combination with the inventive resin composition is not particularly limited, but examples of the thermoplastic resin include homopolymers, copolymers and terpolymers of any of polyesters such as polyethylene terephthalate and polybutylene terephthalate, polyamides such as nylon 6 and nylon 66, and polyolefins such as polypropylene and polymethyl pentene. These resins may be used either alone or in combination.

The multi-component filament may be, for example, of a sheath-core type, an eccentric core-sheath type, a side-by-side type, a dividable type or a sea-island type. The sectional shape of the multi-component filament is not particularly limited, but may be round, oval, hollow, triangular, square, rhombic, star-shaped or flat, or profiled in other ways.

Where the multi-component filament is of the sheath-core type, the multi-component filament may include a sheath portion of the component ($\alpha$) and a core portion of the component ($\beta$), or may include a sheath portion of the component ($\beta$) and a core portion of the component ($\alpha$). Where the surface hydrophilic property is required, the sheath portion and the core portion are composed of the component ($\alpha$) and the component ($\beta$), respectively. Thus, a hydrophilic filament having higher stretchability and higher strength is provided. Where a hollow filament is to be provided, the sheath portion and the core portion are composed of the component ($\beta$) and the component ($\alpha$), respectively. In this case, the core portion may include a plurality of core portions. By dissolving away the core portions in water, various types of hollow filaments can be provided.

Where the multi-component filament is of the dividable type, the multi-component filament may include a plurality of segments of the component ($\beta$) separated by a portion of the component ($\alpha$), or may include a plurality of segments of the component ($\alpha$) separated by a portion of the component ($\beta$). Preferably, the multi-component filament includes a plurality of segments of the component ($\beta$) separated by a portion of the component ($\alpha$). Any of known dividable arrangements may be employed, but the multi-component filament is typically radially dividable into an even number of segments, and preferably radially dividable into 4 to 8 segments.

Where the multi-component filament is of the sea-island type, the multi-component filament includes a sea portion and island portions which are composed of the component ($\alpha$) and the component ($\beta$), respectively, or vice versa. A filament having water solubility, hydrophilic property and water resistance controlled as desired can be provided by adjusting the distribution ratio of the island portions in the sea portion. Where the island portions are composed of the component ($\alpha$), the surface of the filament can be modified by dissolving away the island portions in water.

As described above, a filament can be produced as having controlled solubility and modified texture and surface quality by co-spinning the components ($\alpha$) and ($\beta$). Further, various types of functional filaments such as a hollow filament can be produced by dissolving away the component (α) in water. The functions of the filaments can be controlled by adjusting the composition ratio.

The volume ratio of the inventive resin composition (α) and the thermoplastic resin (β) in the multi-component filament is typically 1/9 to 9/1, preferably 2/8 to 8/2, particularly preferably 3/7 to 7/3. The volume ratio is properly adjusted according to intended physical properties of a final product. If the volume ratio of the inventive resin composition (α) is too small, it is impossible to impart the filament with the hydrophilic property. Conversely, if the volume ratio of the inventive resin composition (α) is too great, the filament is likely to be dissolved or dispersed in water.

The resulting filament may be drawn as required. The drawing temperature is typically 75° C. to 190° C., and a draw ratio is typically 1.5 to 8. As required, the filament may be crimped by means of a crimping machine, and then cut to a predetermined length.

The denier and the diameter of the filament are not particularly limited, but may be properly selected depending on the filament forming method and the use purpose. The denier of the filament is typically 1.5 to 20 denier, preferably 2 to 15 denier, particularly preferably 2 to 5 denier. The diameter of the filament is typically 0.1 to 25 μm, preferably 1 to 20 μm. A filament having a diameter on the order of nanometers may be formed for a special application. With a filament diameter in this range, the filament is satisfactory in strength, flexibility and water-solubility and, therefore, a fabric woven from the filament for use as a chemical lace base has sufficient strength and sufficient water-solubility at lower temperatures.

The film produced from the inventive PVA resin composition is useful, for example, for packages (unit packages) of chemical agents such as agricultural chemicals and detergents, (hydraulic) transfer films, sanitary products such as sanitary napkins, diapers and ostomy bags, medical products such as blood absorption sheets, and temporary base materials such as seeding sheets, seeding tapes and embroidery bases.

EXAMPLES

The present invention will hereinafter be described in greater detail by way of examples thereof. It should be understood that the present invention be not limited to the inventive examples within the scope of the present invention. In the following description, "parts" and "%" are based on weight.

Preparation of PVA Resin

In a reaction vessel provided with a reflux condenser, a dropping funnel and a stirrer, 20.5 parts of methanol and 10% of 68.5 parts of vinyl acetate were initially fed, and then the rest of the vinyl acetate and 11.0 parts of 3,4-diacetoxy-1-butene (8 mol % based on the vinyl acetate feed amount) were fed dropwise at constant rates in 9 hours. Then, 0.3 mol % of azobisisobutyronitrile (based on the vinyl acetate feed amount) was fed into the reaction vessel. Then, the temperature was elevated to initiate polymerization in a stream of nitrogen with stirring. When the polymerization ratio of vinyl acetate reached 90%, the polymerization was terminated by adding a predetermined amount of m-dinitrobenzene. In turn, unreacted vinyl acetate monomer was removed from the reaction system by blowing methanol vapor into the system, whereby a methanol solution of the resulting copolymer was provided.

Subsequently, the methanol solution was diluted with methanol for adjusting the concentration of the copolymer at 45%, and the resulting solution was supplied into a kneader. The copolymer was saponified for 3 hours by adding a 2% methanol solution of sodium hydroxide in an amount of 10.5 mmol per 1 mol of the total of a vinyl acetate structural unit and a 3,4-diacetoxy-1-butene structural unit in the copolymer while keeping the temperature of the solution at 35° C. In the course of the saponification, a saponification product was precipitated. After the saponification product grew into granules, the product was filtered, fully rinsed with methanol, and dried at 70° C. for 12 hours in a hot air drier. Thus, an intended PVA was prepared.

The saponification degree of the PVA resin (A1) thus prepared was 95.5 mol % as determined based on an alkali consumption required for hydrolysis of residual vinyl acetate and 3,4-diacetoxy-1-butene. The average polymerization degree was 300 as determined in conformity with JIS K6726. The PVA resin had a melting point of 163° C. as measured by a differential thermal analyzer DSC. The amount of the 1,2-diol structural unit represented by the structural formula (1) was 8 mol % as calculated based on integral values obtained through measurement in a d6-DMSO solution at 50° C. by $^1$H-NMR (300 MHz proton NMR) by using tetramethyl silane as an internal standard.

Calculation of Proportion of 1,2-diol Structural Unit

Three peaks A (4.2 to 4.3 ppm), B (3.4 to 3.6 ppm) and C (1.7 to 1.9 ppm) are present in a $^1$H-NMR chart to indicate the presence of the 1,2-glycol structural unit represented by the structural formula (1). These peaks are consistent to protons present in the following structural formula (1):

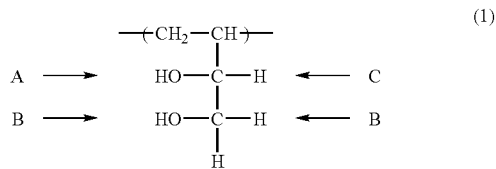

Further, the hydroxyl groups directly bonded to the main chain are indicated by peaks $a_1$ (4.6 ppm), $a_2$ (4.4 ppm) and $a_3$ (4.2 ppm), and the main chain methylene is indicated by a peak $b_1$ (1.0 to 1.7 ppm).

The modification degree was determined from the following expressions based on the integral values of the respective peaks:

$$\frac{A \times 1/2}{a_1 + a_2 + a_3 + A \times 1/2} \times 100 = \alpha \,(\text{mol }\%)$$

$$\frac{B \times 1/2}{b_1 \times 1/2} \times 100 = \beta \,(\text{mol }\%)$$

$$\frac{C}{b_1 \times 1/2} \times 100 = \gamma \,(\text{mol }\%)$$

$$\text{Modification degree (mol \%)} = \frac{\alpha + \beta + \gamma}{3}$$

Example 1

Preparation of PVA Resin Composition

First, 95 parts by weight of the PVA resin (A1) prepared as the PVA resin (A) and 5 parts by weight of a compound (GLPM-60 available from Nippon Nyukazai Co., Ltd.) prepared as the alkylene oxide adduct (B) of the polyvalent alcohol through a reaction between 1 mole of glycerol and 6 moles of ethylene oxide were blended (in a weight ratio (A)/(B) of 95/5), and the resulting mixture was melted and extruded at a resin temperature of 190° C. and pelletized under the following conditions. Extruder: Twin screw extruder (15 mmϕ, L/D=60) having full flight screws (CR=3.12), and provided with a vacuum vent, a cooling belt and a pelletizer
Temperature pattern: C1/C2/C3/C4/C5/C6/C7/C8/D=90/120/150/170/180/180/190/190/190° C.
(wherein C1 to C8 indicate kneading portions of the extruder arranged in this order from a hopper side, and D indicates a dice portion)
Screen mesh: 90/90
Screw rotation speed: 250 rpm Thus, a PVA resin composition was prepared in a pellet form. The PVA resin composition was evaluated in the following manner.
Evaluation
MFR The MFR of the pellets thus prepared was measured at 190° C. with a load of 2160 g. The result is shown in Table 2.
Melting Point The melting point of the pellets was measured by the DSC. The result is shown in Table 2. The measurement conditions are as follows.
First run: −30° C. to 215° C. (at a temperature increase rate of 10° C./min)
Second run: −30° C. to 230° C. (at a temperature increase rate of 10° C./min)
Production of Multilayer Film Using Three Types of Resins A five-layer film was produced by employing an LLDPE (linear low-density polyethylene) NOVATEC UF340 as a material for upper and lower layers, the inventive resin composition as a material for an intermediate layer and ADMER NF 528 as a material for adhesive layers with the use of a multilayer film formation extruding machine including a 40-mmϕ single screw extruder for the upper and lower layers, a 40-mmϕ single screw extruder for the intermediate layer and a 32-mmϕ single screw extruder for the adhesive layers and having the following temperature patterns:
Extruder for Upper and Lower Layers
C1/C2/C3/C4/H/J/D=180/200/210/220/220/210/210° C.;
Extruder for Intermediate Layer
C1/C2/C3/C4/H/J/D=170/180/190/190/210/190/210° C.; and
Extruder for Adhesive Layers
C1/C2/H/J/D=180/200/210/210/210° C.,
wherein C1 to C4 indicate kneading portions of the extruders arranged in this order from a hopper side, H indicates a head, D indicates a dice portion, and J indicates a joint between the kneading portion and the dice portion.

The adhesive strength was evaluated immediately after the film formation and after 7-day storage at 23° C. at 65% RH following the film formation. Further, the transparency, the long-run formability and the odor of the film were evaluated. The results are shown in Table 2. The upper LLDPE layer, the adhesive layer, the intermediate layer of the inventive resin composition, the adhesive layer and the lower LLDPE layer have thicknesses of 80 μm, 15 μm, 30 μm, 15 μm and 80 μm, respectively.
Evaluation
Adhesive Strength The adhesive strength of the multilayer film was measured by means of a measurement apparatus AUTOGRAPH AG-5000A under the following conditions.
Load cell: 100 kg
Separation method: T-shape separation
Size of test strip: 180 mm (length)×15 mm (width)
Inter-chuck distance: 10 mm
Stretching rate: 200 mm/s
Number: 5 to 12
Production of Laminate Film Using Single Resin The inventive resin composition pellets were fed into the three extruders of the aforementioned multilayer film formation extruding machine to form a single-resin laminate film having a thickness of 200 μm.
Evaluation
Transparency The transparency of the film was measured by means of a haze meter (NDH 2000 available from Nippon Denshoku Industries Co., Ltd.)
Long-Run Formability After a multilayer film forming operation was performed for 6 hours, the extruding machine was purged with a high-density polyethylene, and the screws of the extruders were checked for adhesion of the resin composition. In Table 2, a resin composition free from adhesion is indicated by ⊙, a resin composition adhering in a very small amount is indicated by ○, a resin composition adhering in a film form is indicated by Δ, and a resin composition adhering in a great amount is indicated by x.
Odor An odor organoleptic test was performed by five examiners. In Table 2, an odorless film is indicated by ○, a film having slight degradation odor is indicated by Δ, and a film having acetic acid odor and degradation odor is indicated by x.

Examples 2 and 3, and Comparative Examples 1 to 5

Multilayer films were produced and evaluated in substantially the same manner as in Example 1, except that PVA resins (A) and adducts (B) shown in Table 1 were blended in weight ratios shown in Table 1.

TABLE 1

| | PVA resin (A) | | | Adduct (B) | | | |
|---|---|---|---|---|---|---|---|
| | Modification degree (mol %) | Polymerization degree | Saponification degree (mol %) | Polyvalent alcohol | Alkylene oxide | Hydroxyl value (mg KOH/g) | (A)/(B) |
| Example 1 | 8 | 300 | 95.5 | Glycerol | Ethylene oxide 6 moles | 471 | 95/5 |
| Example 2 | 3 | 300 | 89.5 | Glycerol | Ethylene oxide 6 moles | 471 | 95/5 |
| Example 3 | 4.5 | 500 | 88 | Glycerol | Ethylene oxide 9 moles | 345 | 90/10 |
| Comparative Example 1 | 6 | 500 | 98.6 | Glycerol | Ethylene oxide 6 moles | 471 | 95/5 |

TABLE 1-continued

| | PVA resin (A) | | | Adduct (B) | | | |
|---|---|---|---|---|---|---|---|
| | Modification degree (mol %) | Polymerization degree | Saponification degree (mol %) | Polyvalent alcohol | Alkylene oxide | Hydroxyl value (mg KOH/g) | (A)/(B) |
| Comparative Example 2 | 4.5 | 500 | 98.6 | Glycerol | Ethylene oxide 9 moles | 345 | 90/10 |
| Comparative Example 3 | 8 | 500 | 98.6 | Glycerol | Ethylene oxide 2 moles | 628 | 95/5 |
| Comparative Example 4 | 6 | 500 | 78 | Glycerol | Ethylene oxide 6 moles | 471 | 95/5 |
| Comparative Example 5 | 4.5 | 500 | 88 | Glycerol | Ethylene oxide 2 moles | 935 | 90/10 |

TABLE 2

| | MFR (g/10 min) | Melting point (° C.) | Transparency Haze(%) | Long-run formability Resin adhesion | Adhesive strength (N) | | Odor organoleptic test |
|---|---|---|---|---|---|---|---|
| | | | | | Immediately after production | After 7 days | |
| Example 1 | 20 | 158 | 3 | ⊚ | 18 | 18 | ○ |
| Example 2 | 42 | 175 | 4 | ⊚ | 17 | 17 | ○ |
| Example 3 | 32 | 170 | 4 | ⊚ | 14 | 14 | ○ |
| Comparative Example 1 | 32 | 190 | 7 | ⊚ | 15 | 3 | ○ |
| Comparative Example 2 | 30 | 190 | 10 | ⊚ | 16 | 3 | ○ |
| Comparative Example 3 | 42 | 167 | 2 | ⊚ | 18 | 5 | ○ |
| Comparative Example 4 | 7 | 155 | 4 | X | Unable to measure | Unable to measure | X |
| Comparative Example 5 | 30 | 190 | 10 | ⊚ | 16 | 3 | ○ |

As can be understood from the evaluation results shown in Table 2, the resin compositions of Examples 1 to 3 were excellent in compatibility between the PVA resin (A) and the adduct (B) in the melt-forming process to provide highly transparent formed products. The resin compositions of Examples 1 to 3 were less adhesive to metal and hence had excellent long-run formability. Further, the multilayer films produced from the resin compositions of Examples 1 to 3 were excellent in interlayer adhesive strength, and free from odor.

In contrast, resin compositions of Comparative Examples 1 to 3 prepared by employing PVA resins each having the structural unit represented by the general formula (1) and having a higher saponification degree were excellent in transparency and long-run formability and free from odor, but the PVA resins were less compatible with the adduct (B). As a result, the films of Comparative Examples 1 to 3 suffered from bleeding of the adduct (B) over time and, therefore, each had lower adhesive strength.

A resin composition of Comparative Example 4 prepared by employing a PVA resin having the structural unit represented by the general formula (1) and having a lower saponification degree failed to provide a uniform film, so that the measurement of the adhesive strength was impossible. Further, the resin composition of Comparative Example 4 was unsatisfactory in long-run formability and suffered from emanation of strong acetic acid odor.

A resin composition of Comparative Example 5 prepared by employing the same PVA resin (A) as in Example 3 and an alkylene oxide adduct of the polyvalent alcohol having a smaller amount of ethylene oxide as the adduct (B) was excellent in transparency and long-run formability and free from odor, but the PVA resin (A) was less compatible with the adduct (B). As a result, the film of Comparative Example 5 suffered from bleeding of the adduct (B) over time and, therefore, had lower adhesive strength.

As described above, the single-layer film produced from the inventive PVA resin composition alone is useful, for example, as a temporary base material such as a hydraulic transfer film, a seeding sheet, a seeding tape or an embroidery base in applications which require water solubility. The laminate film is useful, for example, for a moisture conditioning container, a gas barrier packaging material, or a recyclable film or container. Exemplary applications of the laminate film include packages (unit packages) of chemical agents such as agricultural chemicals and detergents, sanitary products such as sanitary napkins, diapers and ostomy bags, and medical products such as blood absorption sheets.

Although a specific form of embodiment of the instant invention has been described above in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

What is claimed is:

1. A resin composition comprising:
   (A) a polyvinyl alcohol resin having a 1,2-diol structural unit represented by the following formula (1):

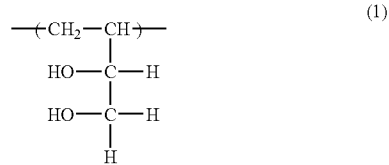

and having a saponification degree of 80 to 97.9 mol %; and
   (B) an alkylene oxide adduct of a polyvalent alcohol containing 6 to 9 moles of an alkylene oxide per 1 mole of the polyvalent alcohol,
   wherein the alkylene oxide adduct of a polyvalent alcohol (B) has a hydroxyl value of 200 to 1500 mg KOH/g.

2. A resin composition as set forth in claim 1, wherein the polyvinyl alcohol resin (A) is a polyvinyl alcohol resin prepared by saponifying a copolymer of a vinyl ester monomer and a 3,4-diacyloxy-1-butene.

3. A resin composition as set forth in claim 1, wherein the 1,2-diol structural unit represented by the formula (1) is present in a proportion of 2 to 15 mol % in the polyvinyl alcohol resin (A).

4. A resin composition as set forth in claim 1, wherein the polyvalent alcohol for the alkylene oxide adduct of a polyvalent alcohol (B) has a carbon number of 2 to 20.

5. A resin composition as set forth in claim 1, wherein the polyvalent alcohol for the alkylene oxide adduct of a polyvalent alcohol (B) has a valence of 2 to 15.

6. A resin composition as set forth in claim 1, wherein the polyvalent alcohol for the alkylene oxide adduct of a polyvalent alcohol (B) is glycerol.

7. A resin composition as set forth in claim 1, wherein the alkylene oxide for the alkylene oxide adduct of a polyvalent alcohol (B) is ethylene oxide.

8. A resin composition as set forth in claim 1, wherein the polyvinyl alcohol resin (A) and the alkylene oxide adduct of a polyvalent alcohol (B) are present in a weight ratio of (A)/(B)=80/20 to 97/3.

9. A resin composition as set forth in claim 1, which has a melt flow rate (MFR) of 10 to 100 g/10 min as measured at 190° C. with a load of 2160 g.

10. A film composed of a resin composition comprising:
    (A) a polyvinyl alcohol resin having a 1,2-diol structural unit represented by the following formula (1):

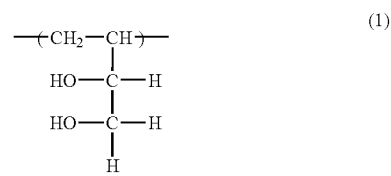

and having a saponification degree of 80 to 97.9 mol %; and
    (B) an alkylene oxide adduct of a polyvalent alcohol containing 6 to 9 moles of an alkylene oxide per 1 mole of the polyvalent alcohol,
    wherein the alkylene oxide adduct of a polyvalent alcohol (B) has a hydroxyl value of 200 to 1500 mg KOH/g.

11. A laminate film comprising a plurality of layers, at least one of which is composed of a resin composition comprising:
    (A) a polyvinyl alcohol resin having a 1,2-diol structural unit represented by the following formula (1):

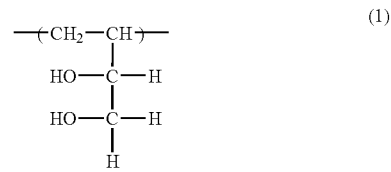

and having a saponification degree of 80 to 97.9 mol %; and
    (B) an alkylene oxide adduct of a polyvalent alcohol containing 6 to 9 moles of an alkylene oxide per 1 mole of the polyvalent alcohol,
    wherein the alkylene oxide adduct of a polyvalent alcohol (B) has a hydroxyl value of 200 to 1500 mg KOH/g.

12. A resin composition as set forth in claim 1, wherein the resin composition is a resin composition for film.

* * * * *

UNITED STATES PATENT AND TRADEMARK OFFICE
CERTIFICATE OF CORRECTION

| | | |
|---|---|---|
| PATENT NO. | : 8,026,302 B2 | Page 1 of 1 |
| APPLICATION NO. | : 12/509634 | |
| DATED | : September 27, 2011 | |
| INVENTOR(S) | : Mitsuo Shibutani et al. | |

It is certified that error appears in the above-identified patent and that said Letters Patent is hereby corrected as shown below:

On the Cover Page, in item (63) of Related U.S. Application Data:

"Continuation of application No. PCT/JP2008/051087, filed on Jan. 25, 2009" should be
-- Continuation of application No. PCT/JP2008/051087, filed on Jan. 25, 2008--.

On the Cover Page, in item (30) of Foreign Application Priority Data:

Delete "Jan. 29, 2008   (JP) ................ 2008-017067".

Signed and Sealed this
Twenty-ninth Day of May, 2012

David J. Kappos
*Director of the United States Patent and Trademark Office*